US012598184B2

(12) United States Patent (10) Patent No.: US 12,598,184 B2
Xiao et al. (45) Date of Patent: Apr. 7, 2026

(54) METHODS FOR CONSTRUCTING TRUSTED GRID, TRUSTED GRIDS, AND APPLICATION INTERACTION METHODS THEREON

(71) Applicant: ALIPAY (HANGZHOU) INFORMATION TECHNOLOGY CO., LTD., Zhejiang (CN)

(72) Inventors: Junxian Xiao, Hangzhou (CN); Shuai Wang, Hangzhou (CN); Shoumeng Yan, Hangzhou (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 291 days.

(21) Appl. No.: 18/526,778

(22) Filed: Dec. 1, 2023

(65) Prior Publication Data

US 2024/0205224 A1 Jun. 20, 2024

(30) Foreign Application Priority Data

Dec. 15, 2022 (CN) .......................... 202211620479.X

(51) Int. Cl.
*H04L 9/40* (2022.01)
(52) U.S. Cl.
CPC .......... *H04L 63/101* (2013.01); *H04L 63/168* (2013.01)
(58) Field of Classification Search
CPC ............................ H04L 63/101; H04L 63/168
See application file for complete search history.

(56) References Cited

U.S. PATENT DOCUMENTS

| | | | | |
|---|---|---|---|---|
| 10,972,265 B2 * | 4/2021 | Novak | ................. | H04L 9/3263 |
| 11,126,757 B2 * | 9/2021 | Volos | ..................... | G06F 21/85 |
| 11,314,882 B2 * | 4/2022 | Porter | ..................... | G06F 21/64 |
| 11,847,253 B2 * | 12/2023 | Bursell | .................. | G06F 21/71 |

OTHER PUBLICATIONS

Istio.io [online], "The Istio service mesh," available on or before May 29, 2021, via Internet Archive: Wayback Machine URL<https://web.archive.org/web/20240000000000*/https://istio.io/latest/about/service-mesh/>, retrieved on Apr. 16, 2024, URL<https://istio.io/latest/about/service-mesh/>, 7 pages.

* cited by examiner

*Primary Examiner* — Amie C. Lin
(74) *Attorney, Agent, or Firm* — Fish & Richardson P.C.

(57) ABSTRACT

Trusted grid construction includes respectively loading, by a plurality of computing nodes, uniform target code in trusted execution environments (TEEs) of the plurality of computing nodes. A target metric value corresponding to the target code is stored to form a plurality of trusted nodes, where target logic corresponding to the uniform target code includes trusted proxy logic configured to provide a security related service for an upper-layer application. Each trusted node performs mutual verification with another trusted node based on the target metric value. A secure connection is established to the another trusted node after the mutual verification is passed, where a plurality of trusted nodes that establish secure connections to each other form a trusted grid.

20 Claims, 5 Drawing Sheets

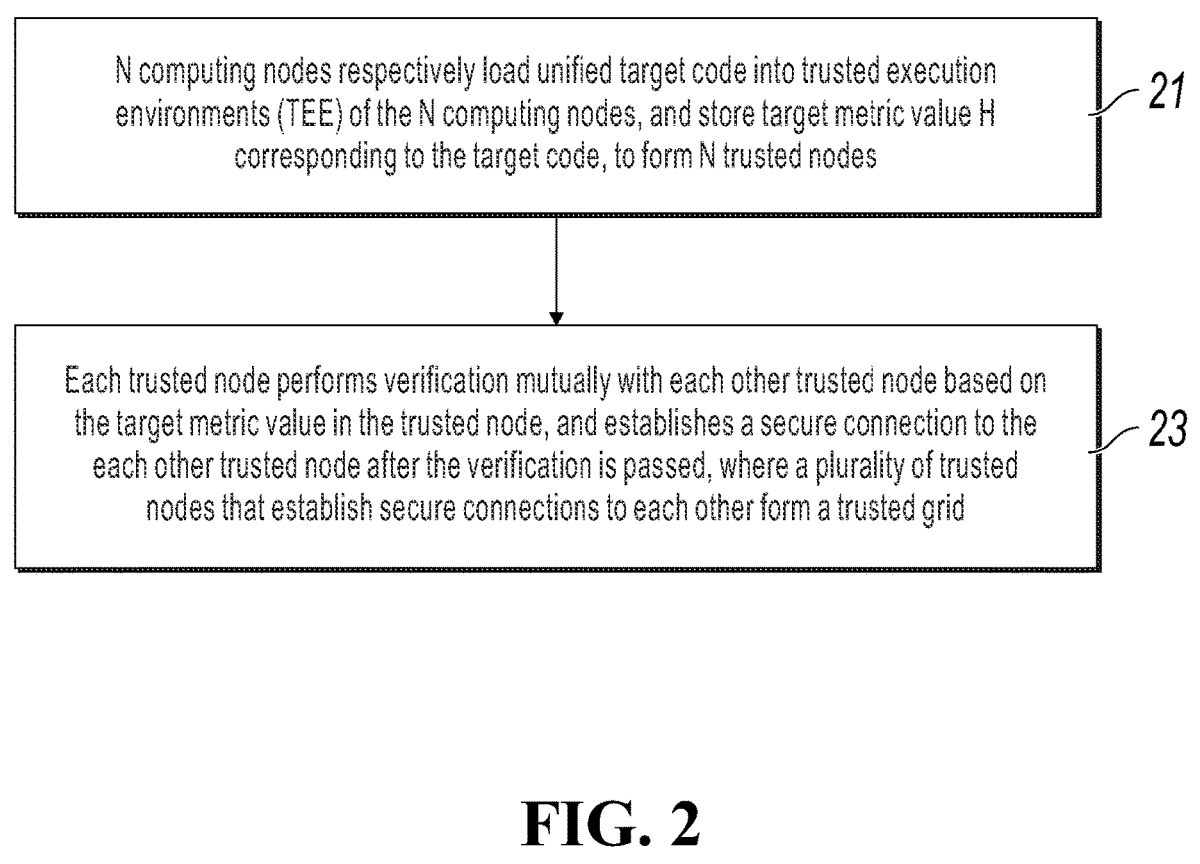

N computing nodes respectively load unified target code into trusted execution environments (TEE) of the N computing nodes, and store target metric value H corresponding to the target code, to form N trusted nodes ⟋ 21

Each trusted node performs verification mutually with each other trusted node based on the target metric value in the trusted node, and establishes a secure connection to the each other trusted node after the verification is passed, where a plurality of trusted nodes that establish secure connections to each other form a trusted grid ⟋ 23

FIG. 2

METHODS FOR CONSTRUCTING TRUSTED GRID, TRUSTED GRIDS, AND APPLICATION INTERACTION METHODS THEREON

CROSS-REFERENCE TO RELATED APPLICATIONS

This application claims priority to Chinese Patent Application No. 202211620479. X, filed on Dec. 15, 2022, which is hereby incorporated by reference in its entirety.

TECHNICAL FIELD

One or more embodiments of this specification relate to the field of data security and trusted computing, and in particular, to methods for constructing, by using trusted execution environment (TEE) technology, a basic service network for implementing trusted secure computing, and trusted grids formed thereon.

BACKGROUND

Currently, the industry pays more attention to data security and personal privacy. In recent years, various data protection related policies and regulations have been promulgated nationwide. As an important technical means for data security protection and compliance, privacy computing is increasingly valued and applied. Technical means used for privacy computing include secure multi-party computation, federal learning, trusted execution environments (TEE), privacy differentiation, etc. Each technical means has corresponding characteristics and use scenarios. The TEE is a technology that focuses on dependence on trusted hardware in privacy computing, and has very high performance and flexibility. Regardless of whether the TEE is used as an independent privacy computing technology solution or is combined with another technology, the TEE plays its specific role in many data processing and collaboration service scenarios. Therefore, for various computing tasks and service functions, developing trusted applications suitable for the TEE environment becomes a trend and a need.

However, the development of the TEE-based trusted applications needs to take full consideration of characteristics and programming modes of the TEE environment, which has relatively high complexity. Therefore, an improved solution is desired to provide a basic service network for trusted secure computing, to facilitate development, deployment, and interaction of upper-layer applications.

SUMMARY

One or more embodiments of this specification describe data processing methods and management apparatuses in a trusted platform, so that privacy computing can be securely performed, and multi-party joint computing and permission management can be supported, thereby fully satisfying a privacy computing need of a user.

According to a first aspect, a method for constructing a trusted grid is provided, including the following:

A plurality of computing nodes respectively load unified target code into trusted execution environments (TEE) of the computing nodes, and store a target metric value corresponding to the target code, to form a plurality of trusted nodes, where target logic corresponding to the target code includes trusted proxy logic configured to provide a security related service for an upper-layer application; and each trusted node performs verification mutually with each other trusted node based on the target metric value, and establishes a secure connection to the each other trusted node after the verification is passed, where a plurality of trusted nodes that establish secure connections to each other form the trusted grid.

In some embodiments, the trusted proxy logic includes an identity management module, configured to provide a trusted identity identifier; and a key management module, configured to manage a key, and perform a key related operation.

In other embodiments, the trusted proxy logic further includes one or more of the following: an application configuration management module, configured to manage configuration information hosted by the upper-layer application; and a compliance policy engine, configured to perform compliance verification on user data and code.

According to some implementations, the target logic further includes trusted plug-in extension logic, and the method further includes the following: A first trusted node in the plurality of trusted nodes invokes the trusted plug-in extension logic to load one or more trusted plug-ins specified in a first trusted configuration that is set for the first trusted node, and verifies the one or more trusted plug-ins.

Further, in some embodiments, the first trusted configuration is set by specifying the one or more trusted plug-ins in a trusted plug-in list formed in advance, and the trusted plug-in list includes plug-in information of candidate trusted plug-ins submitted by a developer to a management entity.

Further, in some examples, the plug-in information can include compiled files and plug-in metric values of the candidate trusted plug-ins; and correspondingly, the verifying the one or more trusted plug-ins includes the following: verifying corresponding trusted plug-ins based on plug-in metric values corresponding to the one or more trusted plug-ins.

According to some implementations, the plurality of trusted nodes include a first trusted node formed in a first computing node, and the method further includes the following: The first computing node deploys a first application on the first trusted node. The first application is configured to invoke the trusted proxy logic in the first node during running, to obtain a security related service.

Further, in some examples, the first trusted node and the first application run in a same network interworking environment.

According to some implementations, the plurality of trusted nodes include a first trusted node and a second trusted node, and the performing verification mutually with each other trusted node based on the target metric value includes the following: The first trusted node obtains a second remote attestation report provided by the second trusted node, where the second remote attestation report includes a second metric value; and the first trusted node compares a target metric value stored by the first trusted node with the second metric value, and verifies the second remote attestation report based on a comparison result.

Further, in some embodiments, the performing verification mutually with each other trusted node based on the target metric value further includes the following: The first trusted node generates a first remote attestation report corresponding to the first trusted node, where the first remote attestation report includes the target metric value; and the first trusted node provides the first remote attestation report to the second trusted node for verification.

In some implementations, a trusted gateway is further deployed in a TEE of each trusted node, and the establishing a secure connection includes the following: establishing a secure connection to another trusted node by using the trusted gateway.

According to a second aspect, a method for performing application interaction by using a trusted grid is provided. The trusted grid includes a plurality of trusted nodes that establish secure connections to each other, each trusted node is formed by deploying unified target code into a TEE of a corresponding computing node, and implements verification mutually with each other trusted node based on a target metric value that corresponds to the target code and is stored in the trusted node. Target logic corresponding to the target code includes trusted proxy logic configured to provide a security related service for an upper-layer application. The plurality of trusted nodes include a first trusted node and a second trusted node, the first trusted node has a first trusted identity identifier, and the second trusted node has a second trusted identity identifier. The method includes the following:

A first application deployed on the first trusted node transmits a first data packet to the first trusted node, where the first data packet includes first data and the second trusted identity identifier as a receiver application identity; the first trusted node transmits the first data to the second trusted node through the secure connection based on the second trusted identity identifier; and the second trusted node transmits a second data packet to a second application deployed on the second trusted node, where the second data packet includes the first data and the first trusted identity identifier as an initiator application identity.

According to a third aspect, a trusted grid system is provided, including a plurality of trusted nodes that establish secure connections to each other. Each trusted node is formed by deploying unified target code in a TEE of a corresponding computing node, and implements verification mutually with each other trusted node based on a target metric value that corresponds to the target code and is stored in the trusted node, and target logic corresponding to the target code includes trusted proxy logic configured to provide a security related service for an upper-layer application.

According to a fourth aspect, a computing node is provided. The computing node has a trusted execution environment (TEE). Target code is deployed in the TEE, and a target metric value corresponding to the target code is stored in the TEE, to form a trusted node. Target logic corresponding to the target code includes trusted proxy logic configured to provide a security related service for an upper-layer application. In addition, the trusted node is configured to perform, based on the target metric value, verification mutually with each other trusted node that is also deployed with the target code and stores the target metric value, and establish a secure connection to the each other trusted node after the verification is passed.

According to a fifth aspect, a computer-readable storage medium is provided. The computer-readable storage medium stores a computer program, and when the computer program is executed on a computer, the computer is enabled to perform the method according to the first aspect.

According to a sixth aspect, a computing device is provided, including a memory and a processor. The memory stores executable code, and when executing the executable code, the processor implements the method according to the first aspect.

In the embodiments of this specification, TEE security related functions commonly used in trusted applications are abstracted to form a trusted grid as an infrastructure. Specifically, the trusted grid includes a plurality of trusted nodes that establish secure connections to each other. Each trusted node is formed by deploying unified target code in a TEE of a corresponding computing node, and implements verification mutually with each other trusted node based on a unified target metric value stored in the TEE. Target logic corresponding to the target code includes trusted proxy logic configured to provide a security related service for an upper-layer application. Based on the trusted grid, development, deployment, running, and interaction of the trusted applications can be greatly simplified.

BRIEF DESCRIPTION OF DRAWINGS

To describe the technical solutions of the embodiments of this application more clearly, the following briefly describes the accompanying drawings needed for describing the embodiments. Clearly, the accompanying drawings in the following description show merely some embodiments of this application, and a person of ordinary skill in the art can still derive other drawings from these accompanying drawings without creative efforts.

FIG. 2 illustrates a process of a method for constructing a trusted grid, according to some embodiments;

DESCRIPTION OF EMBODIMENTS

Figure 1:
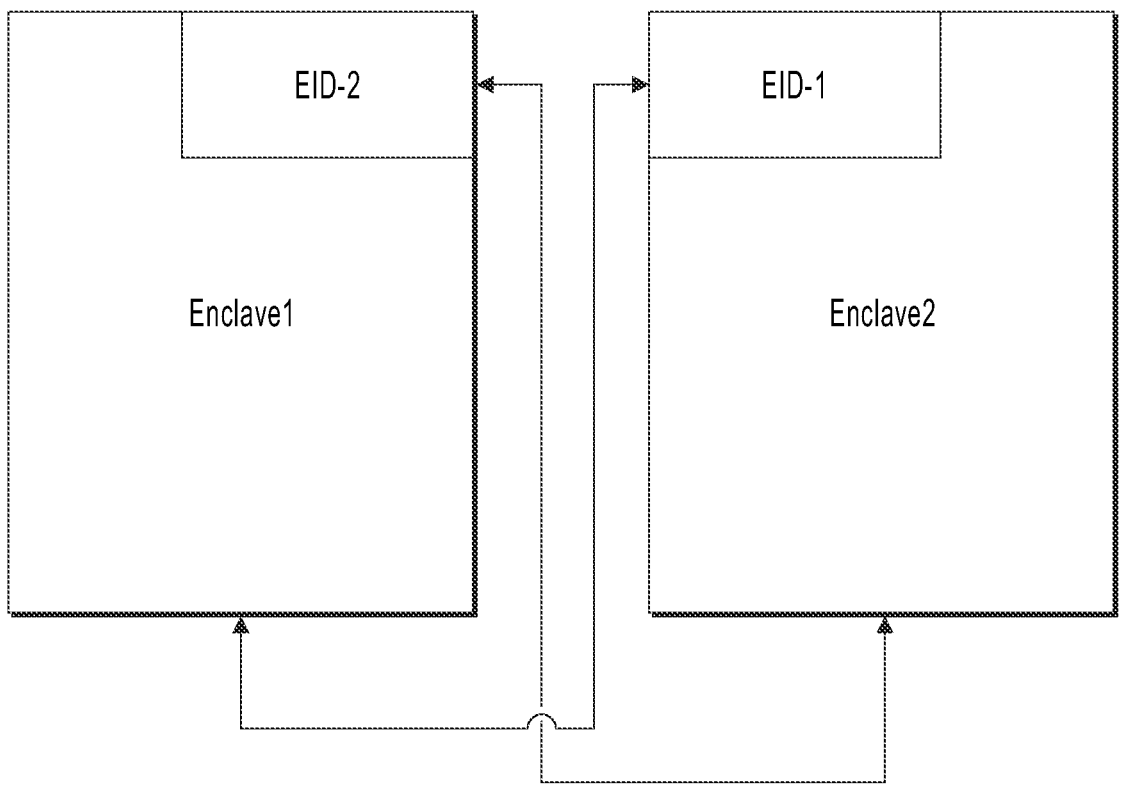
FIG. 1 is a schematic diagram illustrating mutual verification between two TEE applications, according to some embodiments.

The following describes the solutions provided in this specification with reference to the accompanying drawings.

To improve data security, secure computing of privacy data can be performed based on a trusted execution environment (TEE) technology. The TEE is a secure extension based on hardware of a central processing unit (CPU). The TEE provides an environment isolated from the outside, and a program status and code in the environment are trusted. The TEE can act as a black box. Even an operating system layer cannot peep into code and data in the TEE, and only an interface predetermined in the code can perform an operation on the code and the data. In terms of efficiency, due to the black box feature of the TEE, operation in the TEE uses plaintext data, and is not complex cryptographic operation in homomorphic encryption, and therefore, there is almost no loss of efficiency in the computing process.

In the TEE technology, a software guard extension (SGX) technology is used as an example for explanation. A computing node can create an enclave based on the SGX technology as a TEE for executing a specific application. In the computing node, a part of memory called an enclave page cache (EPC) can be allocated by using processor instructions newly added in the CPU. This EPC is used to store the enclave's content, including its code and data. A memory area corresponding to the EPC is encrypted by a memory encryption engine (MEE) inside the CPU, content (code and data in the enclave) in the memory area can be decrypted only in a core of the CPU, and a key used for encryption and decryption is generated and stored in the CPU only when the EPC starts. It can be seen that a security boundary of the enclave includes only the enclave and the CPU, neither privileged software nor unprivileged software can access the enclave, and even an operating system administrator and a virtual machine monitor (VMM) (also referred to as a hypervisor) cannot affect the code and the data in the enclave. Therefore, security is very high. In addition to ensuring the security, the CPU can process the data in the enclave, which has very high operation efficiency. Therefore, both data security and computing efficiency are considered. In addition, data imported to or exported from the TEE can be encrypted, so that security of privacy data is ensured.

Before the CPU supporting SGX is delivered from the factory, a manufacturer burns a provisioning key and a sealing key into a fuse register in the CPU. The fuse register is a one-time programmable register. Once data are written into the fuse register, a fuse is blown, so that subsequently, content in the register is read-only and no longer writable. The manufacturer promises that the keys burned into the fuse register are randomly generated, and further promises that all backups of the burned keys are destroyed after the keys are burned, in other words, even the manufacturer does not know the burned keys. The provisioning key can represent a part of information in the CPU, for example, a code number (for example, a sixth generation core or a seventh generation core) and a model (for example, a desktop type or a mobile type) of the CPU. For security reasons, operations such as encryption and signature are not performed directly by using the provisioning key, but are performed by using an attestation key derived from the provisioning key. Therefore, the provisioning key is used for deployment.

The TEE of the computing node can prove correctness of the program code or other data included in the TEE to a challenger by using a remote attestation mechanism. Before the challenger initiates remote attestation, the CPU in the computing node can detect whether the attestation key exists. If not, the CPU initiates initialization. In the initialization process, an enhanced privacy identification (EPID) can be generated as the attestation key based on a key generation protocol and a provisioning key generation rule by interacting with a server of the manufacturer. The EPID is usually used as private key sk1 in asymmetric encryption keys. The EPID can be stored in the TEE for subsequent signature. Therefore, the server of the manufacturer can obtain public key pk1 corresponding to the EPID through interaction. It is worthwhile to specially note that public key pk1 corresponding to the EPID is not made public, but is only kept by the server of the manufacturer. Such a feature is suitable for attestation performed by the server of the manufacturer, also referred to as an attestation server, in the subsequent remote attestation process.

For example, after the TEE of the computing node prepares sk1 and pk1, that the challenger initiates the remote attestation process to the TEE can include some or all of the following steps.

Step 1: The challenger initiates a challenge request to the TEE of the computing node, and requests the TEE of the computing node to provide a proof, to indicate correctness of the program code or the other data included in the TEE of the computing node.

Step 2: After receiving the challenge request, the TEE of the computing node generates a report, where the report may include a metric value of the program code running in the TEE and other state information related to security, and the metric value is, for example, hash value hash1 of the program code running in the TEE, and then use the above-mentioned private key sk1 to sign the report by using a quoting enclave (QE), to obtain signature sig1, generate a proof quote including the report and sig1, and send the quote to the challenger.

Step 3: Because the challenger may not have public key pk1 corresponding to sk1, the challenger can send the quote to the attestation server after receiving the quote that includes the report and sig1.

Step 4: The attestation server uses public key pk1 to verify signature sig1 in the quote, and returns a verification result to the challenger, where to prevent the verification result from being intercepted or modified, the attestation server can use a private key of the attestation server to sign the verification result to obtain signature sig2, and send the verification result and signature sig2 of the verification result to the challenger together.

Step 5: After the challenger receives the verification result, if the verification result indicates that sig1 is correct, the challenger verifies the report based on verification data (for example, a metric value) obtained in advance, for example, verifies whether a correct hash value of the program code running in the TEE is consistent with hash1 in the report. If the verification on the report is passed, verification on the quote is passed, and the TEE of the computing node completes remote attestation, and then the challenger can execute a specific transaction jointly with the TEE of the computing node.

Or, in other implementations, the TEE of the computing node can actively generate a report, and send the report to the attestation server for verification, to obtain a verification result verified and signed by the attestation server. Subsequently, the TEE provides the verification result to any challenger to prove validity of an identity of the TEE to the any challenger.

Based on the above-mentioned remote attestation mechanism, the challenger needs to obtain a remote attestation report generated by the TEE to verify whether a metric value in the report satisfies an expectation, in other words, whether the metric value is consistent with a reference metric value obtained by the challenger in advance. Therefore, the challenger needs to obtain in advance and securely store the reference metric value. In practice, if the reference metric value is stored in an untrusted part, there is a certain security risk when data are imported. However, if the reference metric value is stored in trusted code, some implementation difficulties also exist. In particular, when the challenger is also a TEE application, mutual verification between the two TEE applications may have a cross-loop verification difficulty.

FIG. 1 is a schematic diagram illustrating mutual verification between two TEE applications, according to some embodiments. As shown in the figure, TEE application 1 (corresponding to Enclave1) and TEE application 2 (corresponding to Enclave2) need to perform mutual remote attestation to gain trust in each other. Specifically, if TEE application 1 needs to verify a remote attestation report of TEE application 2, confidence metric value EID-2 of TEE application 2 needs to be stored in Enclave1 of TEE application 1 in advance. If TEE application 2 needs to verify a remote attestation report of TEE application 1, confidence metric value EID-1 of TEE application 1 needs to be stored in Enclave2 of TEE application 2 in advance. However, taking TEE application 1 as an example, storing confidence metric value EID-2 of the opposite party changes an overall code metric value of TEE application 1, which in turn changes trust metric value EID-1, and affects an overall code metric value of TEE application 2 where confidence metric EID-1 is stored, falling into another cycle.

In addition to the above-mentioned difficulty of TEE remote attestation, the following challenges of a plurality of aspects exist in developing TEE applications. First, in an actual development process of a trusted application, some basic services such as key management and configuration management need to rely on third-party services. However, conventional services are not TEE-based, and can hardly satisfy end-to-end security needs. Therefore, adaptation and reconstruction are sequentially needed, causing very heavy workload. Second, to implement data interaction between trusted applications, some security logic specific to a TEE scenario needs to be developed to ensure data transmission and computing security compliance. The above-mentioned problems cause development and deployment of TEE applications to be considerably complex and difficult.

In view of current needs for privacy computing and TEE applications, to reduce a development difficulty and solve a trust problem, in the embodiments of this specification, a concept of a decentralized trusted grid is provided. The trusted grid provides a basic service for a trusted application based on a TEE technology, and serves as a network for data flow and an underlying guarantee for secure computing.

Figure 3:
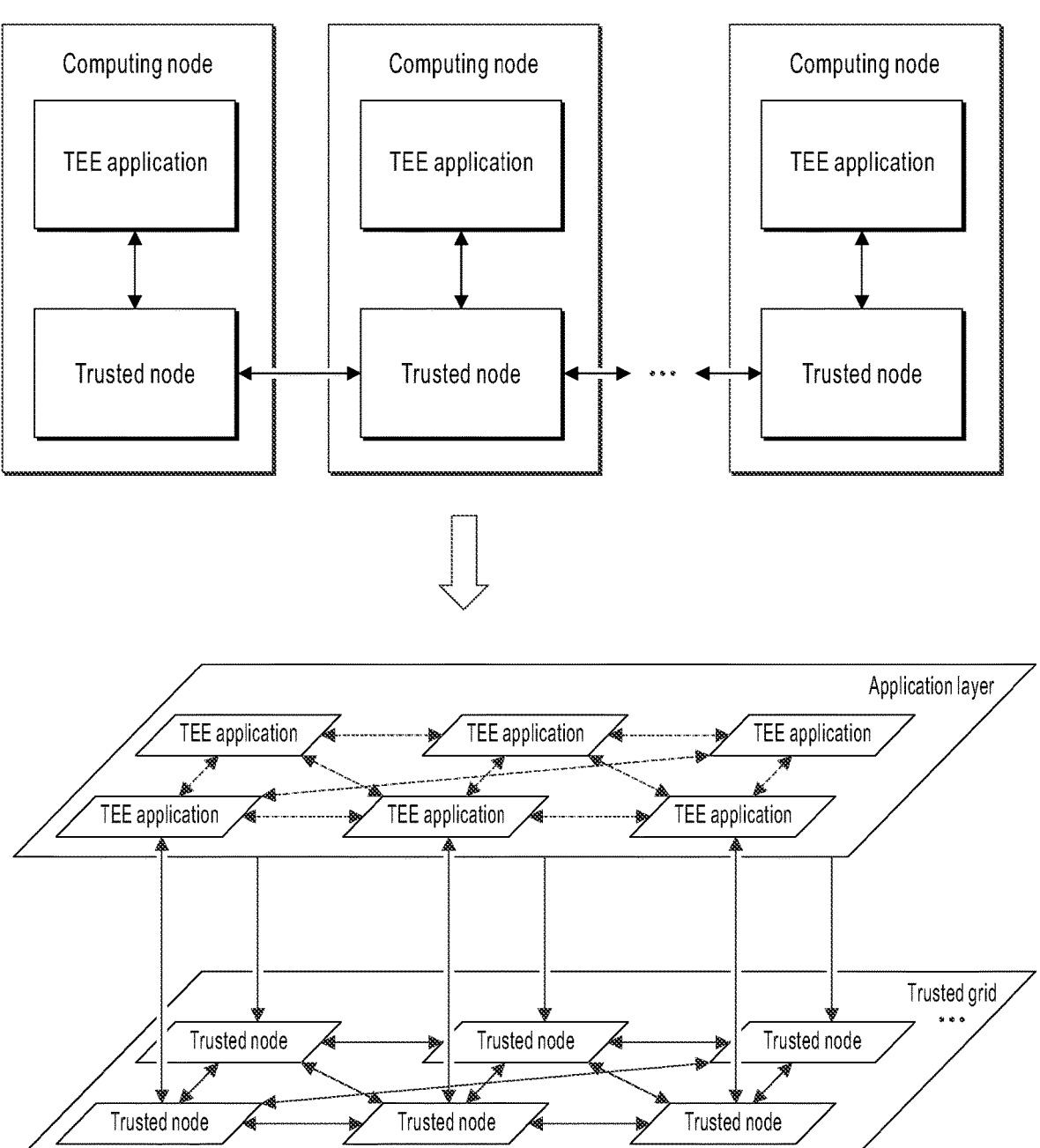
FIG. 3 is a schematic diagram illustrating a trusted grid, according to some embodiments.

FIG. 2 illustrates a process of a method for constructing a trusted grid, according to some embodiments. FIG. 3 is a schematic diagram illustrating a trusted grid, according to some embodiments. With reference to FIG. 2 and FIG. 3, the following describes a process of constructing a decentralized trusted grid and the trusted grid constructed based on the process.

To construct the trusted grid, first, N computing nodes that support a trusted execution environment (TEE) need to be determined. In TEEs of the N computing nodes, target code corresponding to unified target logic is deployed, and target metric value H corresponding to the target code is stored. Correspondingly, as shown in step 21 in FIG. 2, the N computing nodes respectively load unified target code into trusted execution environments (TEE) of the N computing nodes, and store target metric value H corresponding to the target code, to form N trusted nodes. Target logic corresponding to the unified target code includes trusted proxy logic configured to provide a security related service for an upper-layer application. The security related service can include basic security services such as identity identifier management, key management, and encryption/decryption. In other words, each trusted node can be considered as a TEE basic application formed in a corresponding computing node. The TEE basic application has the unified target logic and the target code, stores unified metric value H, and provides a security related basic service for an upper-layer application.

Then, in step 23, each trusted node performs verification mutually with each other trusted node based on the target metric value in the trusted node, and establishes a secure connection to the each other trusted node after the verification is passed. A plurality of trusted nodes that establish secure connections to each other form the trusted grid.

As previously described, verification between TEE applications is implemented based on a remote attestation mechanism, and a verification process thereof includes comparing a metric value in a remote attestation report generated by the opposite party with a metric value obtained by the TEE application in advance. Because the unified target code and unified target metric H are deployed in each trusted node, mutual verification between the trusted nodes can be implemented very easily.

Specifically, assuming that the N trusted nodes include first trusted node A and second trusted node B, a verification process between the trusted nodes A and B can be performed as follows. First trusted node A obtains remote attestation report Report B generated by second trusted node B. Remote attestation report Report B includes metric value H'. First trusted node A compares target metric value H stored by first trusted node A with metric value H' in report Reprt B, and verifies remote attestation report Report B based on a comparison result. Because the unified target code and unified target metric value H are deployed in each trusted node, normally, metric value H' in remote attestation report Report B of second trusted node B is unified target metric value H, and first trusted node A can obtain a comparison result that the two are consistent, so that verification on node B succeeds.

Correspondingly, first trusted node A also generates remote attestation report Report A corresponding to first trusted node A. Remote attestation report Report A includes target metric value H. First trusted node A provides remote attestation report Report A to second trusted node B for verification. Second trusted node B can verify node A similarly.

It can be seen that because the unified target code is deployed in each trusted node, target metric value H stored in the trusted node is not only a code metric value of the trusted node, but also a code metric value of another trusted node, and no longer affects the target code. This reduces the cross-loop difficulty in mutual verification between two TEE applications in FIG. 1.

In some embodiments, a trusted gateway is further deployed in a TEE of each trusted node. After mutual verification between two trusted nodes is passed, a secure connection can be established with the opposite party by using the trusted gateway. The secure connection can be a connection method based on various security protocols, for example, a secure channel constructed based on a transport layer security (TLS) protocol.

As such, after mutual verification between each trusted node and each other trusted node is passed, a secure connection is established between the trusted nodes. A plurality of trusted nodes that establish secure connections to each other form the trusted grid.

As shown in FIG. 3, a TEE application can be deployed on any trusted node of the trusted grid. For example, application a is deployed on first trusted node A. Application a can invoke trusted proxy logic in trusted node A to obtain a security related service. The security related service can include providing an identity identifier of node A for application a as a verified application identity identifier, providing secure computing such as encryption and decryption for application a, and providing security network transmission for application a. Similarly, corresponding applications can be deployed on the trusted nodes. As such, as shown in FIG. 3, the plurality of deployed applications form an application layer, and the trusted grid provides a trusted network layer below the application layer.

Compared with traditional TEE applications, it can be seen that application development and deployment based on the trusted grid are greatly simplified. As mentioned earlier, traditional TEE application development requires addressing issues related to the validation of trusted applications, the provision of security foundational services, and secure data interaction. However, in a trusted grid, trusted nodes can easily verify each other based on unified code and metric values, simplifying mutual validation between trusted nodes. Trusted nodes bestow their verified identities upon upper-layer deployed applications, eliminating the need for these applications to concern themselves with inter-application validation. In addition, the trusted proxy logic deployed in the trusted node can provide complete basic security services for the upper-layer application. Therefore, the upper-layer application does not need to develop these basic service functions. Further, secure connections have been established between the trusted nodes in the trusted grid. Upper-layer applications may not need to interact at an application layer in FIG. 3 (as shown by a dashed line), but implement security data transmission by using the trusted grid, and therefore do not need to consider a security data interaction problem. As such, a TEE application developed and deployed based on the trusted grid only needs to focus on a specific service function of the application, and does not need to focus on a traditional TEE related verification problem, basic security service problem, and data interaction problem, so that application development and deployment complexity is greatly reduced.

It is worthwhile to note that although a TEE application is deployed on each trusted node in FIG. 3, it can be understood that applications can be deployed based on needs in practice. In some embodiments, TEE applications are deployed only on some trusted nodes, while no applications are temporarily deployed on the others. In addition, the trusted node can also support some common applications that need security services. Correspondingly, in other embodiments, TEE trusted applications are deployed on a part of trusted nodes, while common applications are deployed on some trusted nodes. In conclusion, the trusted grid provides a basic security network for development and deployment of upper-layer applications. Based on the basic security network, providers and developers of applications/ services can develop and deploy various application functions as needed.

In addition, it should be understood that the trusted grid and applications on the trusted grid can be deployed within a same organization/agency/region, or can be organized and deployed across different organizations/agencies/regions. This is not limited here.

Figure 4:
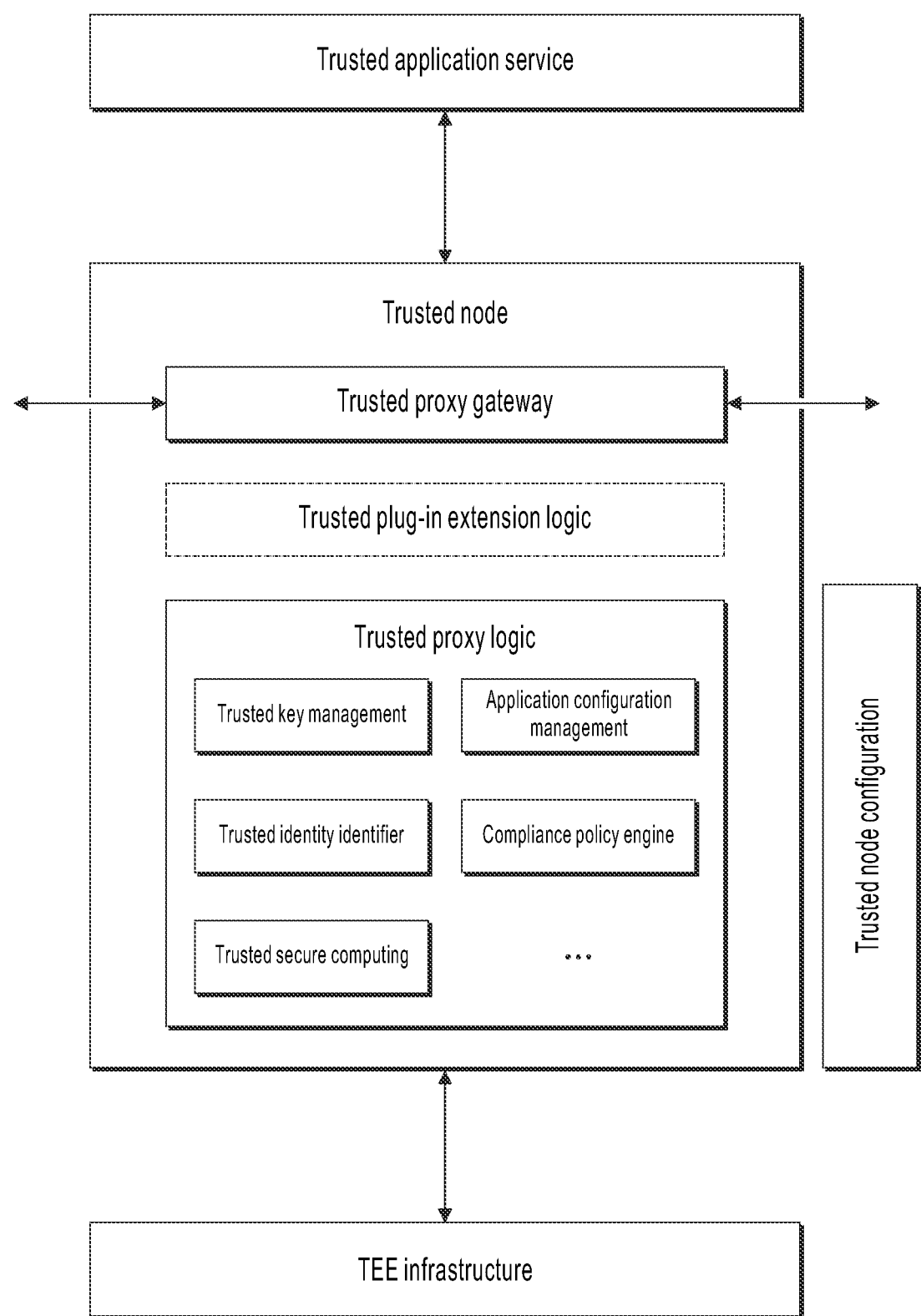
FIG. 4 is a schematic diagram illustrating a trusted node formed in a single computing node.

FIG. 4 is a schematic diagram illustrating a trusted node formed in a single computing node. As shown in FIG. 4, a specific computing node, referred to as a first computing node below, has a TEE infrastructure at a bottom layer, for example, a CPU that supports SGX. Based on the TEE infrastructure, the first computing node can provide a TEE execution environment. In the TEE execution environment, target code corresponding to unified target logic is deployed, to form a trusted node, referred to as first trusted node A below. The first computing node can configure first trusted node A by using a trusted node configuration module. The configuration here can be a deployment setting performed for the trusted node based on characteristics of software and hardware of the computing node.

The first computing node can deploy a trusted application service, referred to as first application a, on first trusted node A. In some embodiments, deploying the target code in the first computing node to form first trusted node A and deploying first application a on trusted node A can be performed together. Certainly, the two can be deployed in sequence. For example, first trusted node A is formed first, and then first application a is deployed on first trusted node A.

In different implementations, the first computing node can be an independent physical machine, a virtual machine implemented through virtualization, or a container implemented through containerization. In cases of virtualized and containerized deployment, the target logic in first trusted node A and first application a run in a same network interworking environment. Specifically, for example, in containerized deployment performed by using Kubernetes, the target logic in first trusted node A and first application a can run in a same pod, so that first application a is bound to a security service in first trusted node A, and is isolated from another task.

The target logic deployed in first trusted node A includes trusted proxy logic, configured to provide a security related service for an upper-layer application. Specifically, the trusted proxy logic can include an identity management module and a key management module.

The identity management module is configured to provide a trusted identity identifier. When invoking the identity management module, first application a can obtain, as an application identity of first application a, a trusted identity identifier generated based on internal private key sk1 of an enclave corresponding to first trusted node A, which is equivalent to performing identity sharing or binding with first trusted node A. Because first trusted node A can implement identity attestation based on the internal private key and a TEE remote attestation mechanism, first application a can directly obtain the trusted identity identifier of first trusted node A as a verified application identity identifier.

The key management module is configured to perform key management and perform a key related operation, and is equivalent to a local key management service (KMS) of the application. The key related operation can include key-based operations such as encryption, decryption, signature, and verification. Managed keys can include internal private key sk1 of the enclave, another key derived based on private key sk1, a key negotiated with another trusted node, etc. When first application a needs to exchange data with another application, the key management module can be invoked to encrypt local data, perform digital signature by using internal private key sk1, decrypt data received from another application, etc.

In addition, optionally, the trusted proxy logic can further include a compliance policy engine, configured to perform compliance verification on user data and code. Specifically, some predetermined compliance verification rules can be deployed in the compliance policy engine. When first application a needs to interact with another application, the compliance policy engine can be invoked to perform compliance verification before data import/export and computing. In some embodiments, before transmitting data, first application a can invoke the compliance policy engine to perform compliance verification on the data to be transmitted, and then transmit the data after the verification is passed. Before performing data processing, first application a can further invoke the compliance policy engine to perform compliance verification on data to be processed, and then perform local data processing after the verification is passed.

It can be understood that different TEE applications are deployed on different trusted nodes, and different TEE applications have different function needs and computing needs. Therefore, different extended functions may need to be deployed on the trusted nodes. Optionally, the trusted proxy logic can include an application configuration management module, configured to manage configuration information hosted by the upper-layer application. The application configuration management module is used to allow a targeted and differentiated configuration setting, for example, setting which extended functions are enabled, for each trusted node based on an upper-layer application deployed on the trusted node.

However, as previously described, trusted nodes forming a trusted grid need to deploy unified target code to achieve mutual verification trust. To settle "contradiction" between code unification and application need differentiation, in some embodiments, the unified target logic deployed on the trusted nodes further includes unified trusted plug-in extension logic. Each trusted node can invoke the trusted plug-in extension logic to load a trusted plug-in specified in configuration information corresponding to the trusted node, to implement differential extension of functions. In addition, as a part of the unified target logic code, the trusted plug-in extension logic also has unified code. Therefore, code consistency between the trusted nodes is not affected, and a trust verification process between the trusted nodes is not affected, either. For example, personalized configuration information for first application a can be set by using an application configuration management module in first trusted node A, to form corresponding first configuration information. Therefore, when starting, first trusted node A can load some customized functions based on the first configuration information.

To implement plug-in function extension, a plug-in developer can develop function modules corresponding to the trusted plug-in based on plug-in implementation specifications. For example, these modules are in a form of a dynamic library. Then the developer submits plug-in source code to a trusted plug-in management entity, and the management entity compiles the source code to provide a compiled file (for example, a binary file) of the plug-in and a corresponding metric value. The management entity can provide a trusted plug-in list to users (computing nodes). The trusted plug-in list includes plug-in information of candidate trusted plug-ins submitted by the developer to the management entity. In some examples, the plug-in information includes compiled files and plug-in metric values of the candidate trusted plug-ins. Each computing node can set a trusted configuration corresponding to the trusted node by specifying a trusted plug-in needed by the node in the trusted plug-in list. For example, the above-mentioned first configuration information can be formed by specifying one or more trusted plug-ins (for example, plug-ins E1 and E2) needed by first trusted node A in the trusted plug-in list.

As such, when starting, first trusted node A can invoke the trusted plug-in extension logic, download and load the one or more trusted plug-ins, for example, the plug-ins E1 and E2, specified in a first trusted configuration, and verify these trusted plug-ins. Specifically, first trusted node A can obtain compiled files and plug-in metric values from the plug-in information of the trusted plug-in list. Or, first trusted node A can compile plug-in source code, and generate plug-in metric values through calculation based on compiled files. Then first trusted node A verifies the corresponding trusted plug-ins based on the plug-in metric values. After the verification is passed, first trusted node A can invoke an extended function interface provided by using the plug-ins E1 and E2. As such, differentiated function extension of the trusted nodes is implemented, and unified code of the trusted nodes is also ensured.

In some embodiments, the trusted proxy logic further includes a trusted secure computing module, configured to perform trusted secure computing in the TEE. Compared with an operation performed by using a key in a key management module, the trusted secure computing module can provide various computing operators, and a combination of these operators provides general and pervasive secure computing. In other implementations, the trusted secure computing module is not included in the trusted proxy logic of the unified code, but is a plug-in module extended by using the trusted plug-in extension logic based on a need of first application a. Regardless of a deployment method, during running, first application a on first trusted node A can invoke the trusted secure computing module to enable the trusted secure computing module to perform secure computing on sensitive data of first application a in the TEE.

It is worthwhile to note that in different embodiments, the trusted proxy logic can further include other security service functions that are set based on needs. The functions are not enumerated here.

As shown in FIG. 4, a trusted gateway is further deployed in the trusted node. The trusted nodes are securely connected by using trusted gateways, to form the trusted grid. The following describes a process of application interaction performed by using such a trusted grid.

Figure 5:
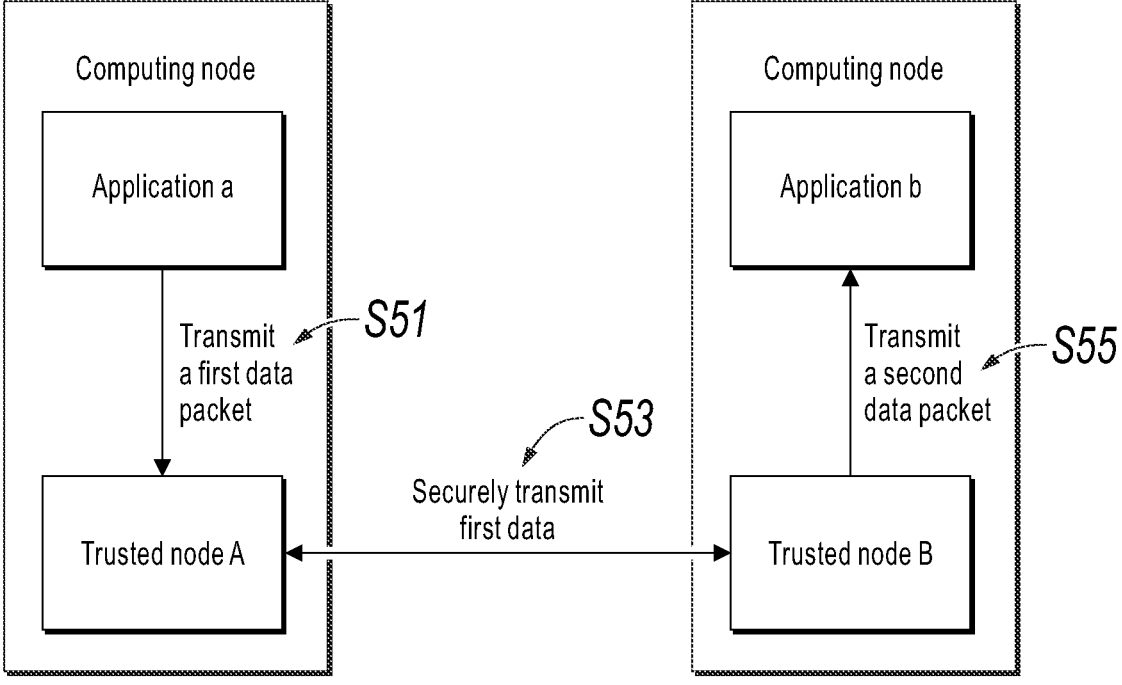
FIG. 5 is a schematic diagram illustrating a method for performing application interaction based on a trusted grid, according to some embodiments.

FIG. 5 is a schematic diagram illustrating a method for performing application interaction based on a trusted grid, according to some embodiments. As previously described, the trusted grid includes a plurality of trusted nodes that establish secure connections to each other. Each trusted node is formed by deploying unified target code in a trusted execution environment (TEE) of a corresponding computing node, and implements verification mutually with each other trusted node based on a target metric value that corresponds to the target code and is stored in the trusted node. Target logic corresponding to the target code includes trusted proxy logic configured to provide a security related service for an upper-layer application. As shown in FIG. 5, the plurality of trusted nodes include first trusted node A and second trusted node B. First application a is deployed on first trusted node A, and second application b is deployed on second trusted node B. In some embodiments, each of first application a and/or second application b is a TEE trusted application.

In some implementations, when starting, first application a invokes the trusted proxy logic in first trusted node A to obtain a security related service. Specifically, first application a can invoke an identity management module in the trusted proxy logic to obtain first trusted identity identifier ID-A of first trusted node A as an application identity identifier of first application a. Correspondingly, second application b can invoke the identity management module in the trusted proxy logic of second trusted node B to obtain second trusted identity identifier ID-B of second trusted node B as an application identity identifier of second application b. It can be understood that first trusted node A and second trusted node B can perform mutual trust verification with each other based on the above-mentioned target metric value by using a remote attestation mechanism. As such, first trusted identity identifier ID-A and second trusted identity identifier ID-B are mutually trusted identity identifiers. First application a and second application b respectively use first trusted identity identifier ID-A and second trusted identity identifier ID-B as the application identity identifiers of first application a and second application b, so that first application a and second application b implement mutual verification and trust based on the identity identifiers of the trusted nodes A and B, and establish a trust relationship.

Optionally, in some embodiments, the target logic deployed in the trusted node further includes trusted plug-in extension logic. Correspondingly, first trusted node A can invoke the trusted plug-in extension logic to load a trusted plug-in, for example, plug-ins E1 and E2, specified in the first trusted configuration that is set for the first trusted node, and verify the trusted plug-in. Therefore, on this basis, during running, first application a can invoke the above-mentioned extended trusted plug-ins E1 and E2 to implement an extended function needed for running the application.

In some embodiments, a trusted secure computing module is deployed in first trusted node A, and is configured to perform trusted secure computing in the TEE. The trusted secure computing module can be deployed in unified code included in the trusted proxy logic, or can be a module extended based on the above-mentioned trusted plug-in extension logic, for example, a module formed based on the trusted plug-ins E1 and E2. Therefore, in some embodiments, during running, first application a invokes the trusted secure computing module to process specified target data in the TEE. The target data can be sensitive data or confidential data of first application a, or can be normal service data. In conclusion, first application a can implement trusted secure computing by using the trusted secure computing module in first trusted node A.

When first application a needs to exchange data with second application b, secure data transmission can be implemented by using a trusted grid.

Specifically, as shown in step S51 in FIG. 5, first application a transmits a first data packet to first trusted node A, where the first data packet includes first data and second trusted identity identifier ID-B as a receiver application identity. The first data can be service data generated or obtained by first application a, and are data to be transmitted to second application b. Based on the above-mentioned mutual verification with second application b, first application a includes second trusted identity identifier ID-B in the first data packet as an application identity of second application b, namely, the receiver application identity, and transmits the first data packet to first trusted node A.

In step S53, first trusted node A transmits the first data to second trusted node B corresponding to second trusted identity identifier ID-B through a secure connection.

In some embodiments, the trusted proxy logic deployed in the trusted node includes a compliance policy engine. Correspondingly, before transmitting the first data, first trusted node A can invoke the compliance policy engine to perform compliance verification on the first data to be transmitted, and determine to transmit the first data after the compliance verification is passed.

According to some embodiments, trusted first trusted node A and second trusted node B are securely connected by using respective trusted gateways. In some examples, the secure connection is a bidirectionally verified encrypted channel negotiated by using a key negotiation protocol, for example, an encrypted channel implemented based on a TLS protocol. In this case, first trusted node A can invoke a key management module in the trusted proxy logic to encrypt the first data by using a key negotiated with node B, and transmit a ciphertext of the first data to second trusted node B.

In step S55, second trusted node B transmits a second data packet to second application b deployed on second trusted node B, where the second data packet includes the first data and first trusted identity identifier ID-A corresponding to first trusted node A as an initiator application identity.

Specifically, second trusted node B receives the ciphertext of the first data by using a trusted gateway. By invoking the key management module in the trusted proxy logic, second trusted node B can decrypt the ciphertext by using the negotiated key to obtain the first data. Optionally, second trusted node B can invoke the compliance policy engine deployed in second trusted node B to perform compliance verification on the transmitted first data, and determine to transmit the first data to an upper-layer application after the compliance verification is passed. Therefore, second trusted node B can transmit the first data and first trusted identity identifier ID-A to second application b deployed on second trusted node B. First trusted identity identifier ID-A is used to notify second application b of the application identity used by the data transmission initiator.

Therefore, second application b obtains the first data, and determines, by using first trusted identity identifier ID-A, that the first data comes from first application a. Therefore, second application b can further process the first data based on agreed logic or an indication.

It can be seen from the above-mentioned process that first application a and second application b implement identity-based trust verification by using the corresponding trusted nodes A and B, and use the trusted grid as a proxy to perform functions such as data encryption and decryption and secure data transmission. First application a and second application b only need to pay attention to service function logic of first application a and second application b, and do not need to consider security related functions in a TEE scenario. These functions are provided and performed by the trusted grid by proxy. It can be seen that abstracting TEE security related functions commonly used in trusted applications to form the trusted grid as an infrastructure greatly simplifies development, deployment, running, and interaction of the trusted applications, and further improve applicability of the trusted applications and privacy computing.

According to some embodiments of another aspect, a trusted grid system is provided, including a plurality of trusted nodes that establish secure connections to each other. Each trusted node is formed by deploying unified target code in a TEE of a corresponding computing node, and implements verification mutually with each other trusted node based on a target metric value that corresponds to the target code and is stored in the trusted node. Target logic corresponding to the target code includes trusted proxy logic configured to provide a security related service for an upper-layer application.

In some embodiments, the trusted proxy logic can include an identity management module, configured to provide a trusted identity identifier; and a key management module, configured to manage a key, and perform a key related operation.

Further, the trusted proxy logic further includes one or more of the following: an application configuration management module, configured to manage configuration information hosted by the upper-layer application; and a compliance policy engine, configured to perform compliance verification on user data and code.

According to some embodiments of still another aspect, a computing node is further provided. The computing node has a trusted execution environment (TEE). Target code is deployed in the TEE, and a target metric value corresponding to the target code is stored in the TEE, to form a trusted node. Specifically, target logic corresponding to the target code includes trusted proxy logic configured to provide a security related service for an upper-layer application. In addition, the formed trusted node is configured to perform, based on the target metric value, verification mutually with each other trusted node that is also deployed with the target code and stores the target metric value, and establish a secure connection to the each other trusted node after the verification is passed.

According to some embodiments of yet another aspect, a computer-readable storage medium is further provided. The computer-readable storage medium stores a computer program, and when the computer program is executed on a computer, the computer is enabled to perform the method described with reference to FIG. 2.

According to some embodiments of still yet another aspect, a computing device is further provided, including a memory and a processor. The memory stores executable code, and when executing the executable code, the processor implements the method described with reference to FIG. 2.

A person skilled in the art should be aware that, in the above-mentioned one or more examples, functions described in this application can be implemented by hardware, software, firmware, or any combination thereof. When being implemented by software, these functions can be stored in a computer-readable medium or transmitted as one or more instructions or codes in the computer-readable medium.

The specific implementations mentioned above provide further detailed explanations of the objectives, technical solutions, and beneficial effects of this application. It should be understood that the above-mentioned descriptions are merely specific implementations of this application and are not intended to limit the protection scope of this application. Any modifications, equivalent replacements, improvements, etc. made on the basis of the technical solutions of this application should all fall within the protection scope of this application.

What is claimed is:

1. A computer-implemented method for trusted grid construction comprising:
   respectively loading, by a plurality of computing nodes, uniform target code in trusted execution environments (TEEs) of the plurality of computing nodes;
   storing a target metric value corresponding to the uniform target code, to form a plurality of trusted nodes, wherein target logic corresponding to the uniform target code comprises trusted proxy logic configured to provide a security related service for an upper-layer application;
   performing, by each trusted node of the plurality of trusted nodes, mutual verification with another trusted node of the plurality of trusted nodes based on the target metric value, wherein the mutual verification comprises remote attestation between the each trusted node by comparing the target metric value stored in the each trusted node; and
   establishing a secure connection to the another trusted node after the mutual verification is passed, wherein the plurality of trusted nodes that establish secure connections to each other form a trusted grid.

2. The computer-implemented method of claim 1, wherein the trusted proxy logic comprises:
   an identity management module, configured to provide a trusted identity; and
   a key management module, configured to manage a key, and perform a key related operation.

3. The method of claim 2, wherein the trusted proxy logic further comprises one or more of:
   an application configuration management module, configured to manage configuration information entrusted by the upper-layer application;
   a compliance policy engine, configured to perform compliance check on user data and code; and
   a trusted secure computing module, configured to perform trusted secure computing.

4. The computer-implemented method of claim 1, wherein:
   the plurality of trusted nodes comprise a first trusted node; and
   the target logic comprises trusted plug-in extension logic.

5. The computer-implemented method of claim 4 comprising:
   invoking, by the first trusted node, the trusted plug-in extension logic to load one or more trusted plug-ins specified in a first trusted configuration that is set for the first trusted node, and verifying the one or more trusted plug-ins.

6. The computer-implemented method of claim 5, wherein:
   the first trusted configuration is set by specifying the one or more trusted plug-ins in a trusted plug-in list formed in advance.

7. The computer-implemented method of claim 6, wherein:
   the trusted plug-in list comprises plug-in information of candidate trusted plug-ins submitted by a developer to a manager.

8. The computer-implemented method of claim 7, wherein:
   the plug-in information of candidate trusted plug-ins submitted by a developer to a manager comprises compiled files and plug-in metric values of the candidate trusted plug-ins.

9. The computer-implemented method of claim 8, wherein:
   verifying the one or more trusted plug-ins comprises:
      verifying corresponding trusted plug-ins based on plug-in metric values corresponding to the one or more trusted plug-ins.

10. The computer-implemented method of claim 1, wherein:
   the plurality of trusted nodes comprise a first trusted node formed in a first computing node.

11. The computer-implemented method of claim 10 comprising:
   deploying, by the first computing node, a first application on the first trusted node, wherein the first application is configured to invoke the trusted proxy logic in the first trusted node during running, to obtain a security related service.

12. The computer-implemented method of claim 11, wherein the first trusted node and the first application run in a same network interworking environment.

13. The computer-implemented method of claim 1, wherein:
   the plurality of trusted nodes comprise a first trusted node and a second trusted node.

14. The computer-implemented method of claim 13, wherein:
   performing mutual verification with another trusted node based on the target metric value comprises:
      obtaining, by the first trusted node, a second remote attestation report generated by the second trusted node, wherein the second remote attestation report comprises a second metric value;
      comparing, by the first trusted node, a target metric value stored by the first trusted node with the second metric value; and
      verifying the second remote attestation report based on a comparison result.

15. The computer-implemented method of claim 14, wherein performing mutual verification with another trusted node based on the target metric value comprises:
   generating, by the first trusted node, a first remote attestation report corresponding to the first trusted node, wherein the first remote attestation report comprises the target metric value.

16. The computer-implemented method of claim 15 comprising:

providing, by the first trusted node, the first remote attestation report to the second trusted node for verification.

17. The computer-implemented method of claim 1, wherein:

a trusted gateway is further deployed in a TEE of each trusted node.

18. The computer-implemented method of claim 17, wherein:

establishing a secure connection comprises:

establishing a secure connection to another trusted node by using the trusted gateway.

19. A non-transitory, computer-readable medium storing one or more instructions executable by a computer system to perform one or more operations comprising:

respectively loading, by a plurality of computing nodes, uniform target code in trusted execution environments (TEEs) of the plurality of computing nodes;

storing a target metric value corresponding to the uniform target code, to form a plurality of trusted nodes, wherein target logic corresponding to the uniform target code comprises trusted proxy logic configured to provide a security related service for an upper-layer application;

performing, by each trusted node of the plurality of trusted nodes, mutual verification with another trusted node of the plurality of trusted nodes based on the target metric value, wherein the mutual verification comprises remote attestation between the each trusted node by comparing the target metric value stored in the each trusted node; and establishing a secure connection to the another trusted node after the mutual verification is passed, wherein the plurality of trusted nodes that establish secure connections to each other form a trusted grid.

20. A computer-implemented system comprising:

one or more computers; and one or more computer memory devices interoperably coupled with the one or more computers and having tangible, non-transitory, machine-readable media storing one or more instructions that, when executed by the one or more computers, perform one or more operations comprising:

respectively loading, by a plurality of computing nodes, uniform target code in trusted execution environments (TEEs) of the plurality of computing nodes;

storing a target metric value corresponding to the uniform target code, to form a plurality of trusted nodes, wherein target logic corresponding to the uniform target code comprises trusted proxy logic configured to provide a security related service for an upper-layer application;

performing, by each trusted node of the plurality of trusted nodes, mutual verification with another trusted node of the plurality of trusted nodes based on the target metric value, wherein the mutual verification comprises remote attestation between the each trusted node by comparing the target metric value stored in the each trusted node; and establishing a secure connection to the another trusted node after the mutual verification is passed, wherein the plurality of trusted nodes that establish secure connections to each other form a trusted grid.

* * * * *